United States Patent [19]

Demy

[11] 4,069,609
[45] Jan. 24, 1978

[54] CASTING LURE

[76] Inventor: Nicholas G. Demy, P.O. Box 38, East Hampton, N.Y. 11937

[21] Appl. No.: 696,892

[22] Filed: June 17, 1976

[51] Int. Cl.$^2$ ............................................. A01K 85/00
[52] U.S. Cl. .................................. 43/42.06; 43/42.22; 43/42.39
[58] Field of Search ................. 43/42.22, 42.06, 42.35, 43/42.39

[56] References Cited

U.S. PATENT DOCUMENTS

| | | | |
|---|---|---|---|
| 2,641,862 | 6/1953 | Poe | 43/42.35 X |
| 2,659,995 | 11/1953 | Hagstrom | 43/42.06 |
| 3,040,465 | 6/1962 | Gierat | 43/42.06 |
| 3,041,772 | 7/1962 | Laszlo | 43/42.06 |
| 3,092,925 | 6/1963 | Ho et al. | 43/42.06 X |
| 3,521,394 | 7/1970 | Wintersberger | 43/42.06 |
| 3,705,465 | 12/1972 | Charney | 43/42.06 |
| 3,982,349 | 9/1976 | Hills | 43/42.39 X |

Primary Examiner—Russell R. Kinsey
Assistant Examiner—Daniel J. Leach
Attorney, Agent, or Firm—Lawrence E. Sklar

[57] ABSTRACT

A novel fishing lure is provided, which in one embodiment comprises a substantially cone-shaped tube, said tube being of larger diameter at its anterior portion and having a multiplicity of apertures in the sides thereof. The apertures allow sand to be retained within the tube when the lure is cast through the air and further allow said sand to be dispersed from the tube when the lure strikes water.

In a second embodiment, the fishing lure comprises a substantially tubular body having a posterior portion and an anterior portion wherein the posterior portion weighs more than the anterior portion. The lure further comprises means at the anterior portion for attaching the lure to a leader, and means at the posterior portion for attaching the lure to a hook.

11 Claims, 4 Drawing Figures

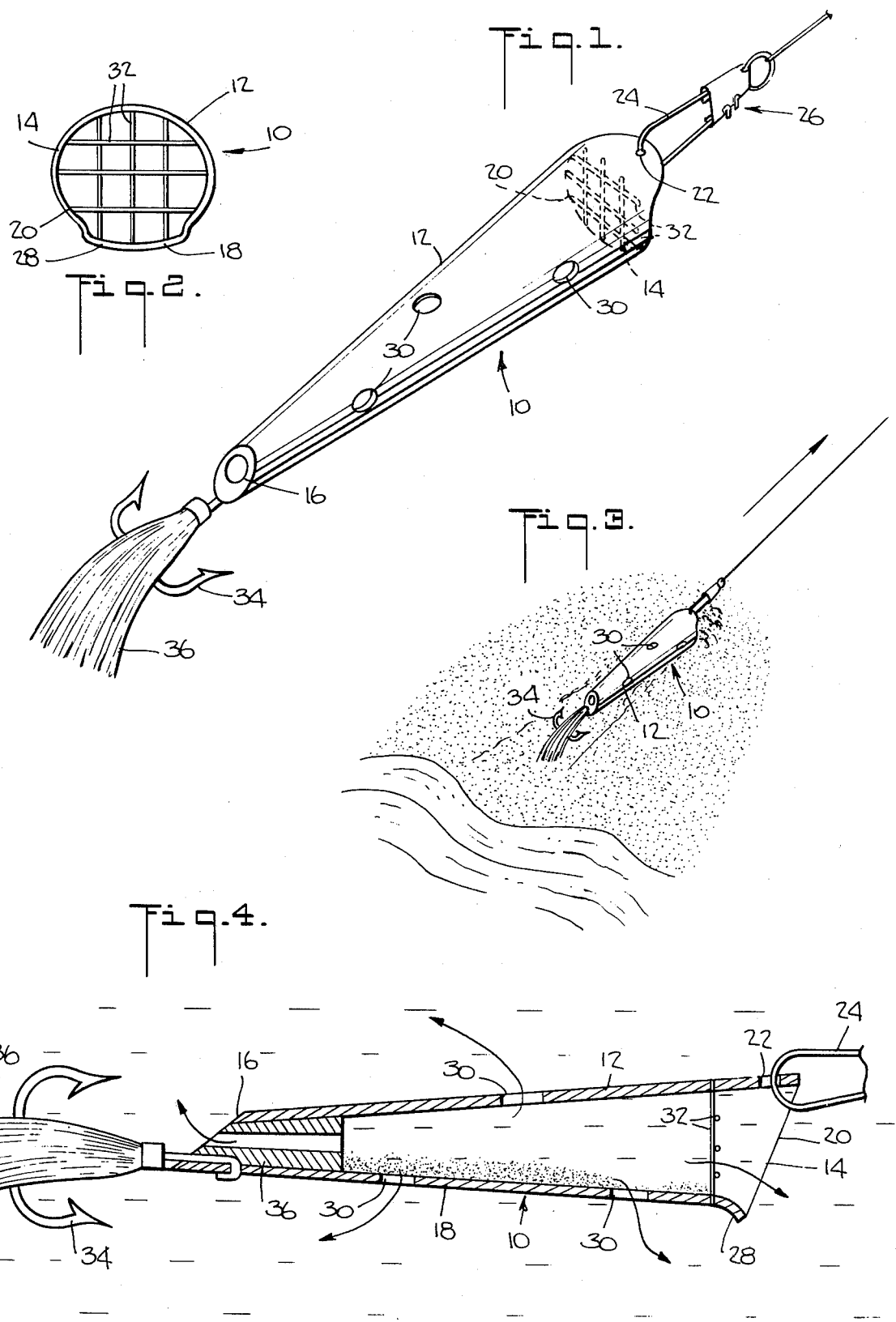

CASTING LURE

BACKGROUND OF THE INVENTION

The instant invention relates to fishing lures, and more particularly to casting lures.

Lures for casting in seas, oceans, lakes, rivers and ponds come in innumerable forms, materials, sizes, colors and weights to simulate the appearance and action of small swimming baitfish which attract the predator fish hunted by the angler. Artificial lures are designed for different functons: on the surface or at various levels below the surface; for casting or trolling; and for fishing on the bottom. In casting, the force and direction of the wind, the length, weight and flexibility of the rod, the weight, strength and composition of the line, and the power and skill of the caster are variable factors. However, the ordinary caster is, in most cases, interested in the longest possible cast he can make with his equipment, experience and existing conditions. All other factors mentioned being equal, the heavier the lure within given limitations, the greater the distance which can be cast. However, the effort in casting and retrieving a heavier lure will also be greater. The signal to an expectant hand that a strike has been made will be weaker, and with repeated casts and retrieval, fatigue is likely to develop sooner, and wear and tear on the line will be greater with the heavier lure.

The instant invention overcomes the aforementioned disadvantages of the heavier lures while simultaneously providing the increased casting distance advantages of the heavier lures. Specifically, the lure of the instant invention facilitates retrieval without impairing the sensitivity of the rod, line and lure when a fish strikes, while also increasing the distance of the cast.

SUMMARY OF THE INVENTION

Accordingly, the instant invention provides fishing lures having their weight or weight distribution designed to increase casting distance. In one embodiment, the lure comprises a substantially cone-shaped tube, said tube being of larger diameter at its anterior portion and having a multiplicity of apertures in the sides thereof whereby sand may be retained within the tube when the lure is cast through the air and whereby said sand may be washed out of the tube when said lure is situated in the water.

In a second embodiment, the lure comprises a substantially tubular body having a posterior portion and an anterior portion, wherein the posterior portion weighs more than the anterior portion, means at the anterior portion for attaching the lure to a leader, and means at the posterior portion for attaching the lure to a hook.

BRIEF DESCRIPTION OF THE DRAWINGS

FIG. 1 is a perspective view of a casting lure embodying all the features of the instant invention;

FIG. 2 is a front elevational view of the lure shown in FIG. 1;

FIG. 3 is a perspective view of the lure shown in FIG. 1 scooping up sand from a sandy shore as it is being retrieved; an FIG. 4 is a vertical, central sectional view of the lure shown in FIG. 1.

DESCRIPTION OF THE PREFERRED EMBODIMENTS

The drawings illustrate both embodiments of the instant invention, although it should be understood that the two embodiments may be used independently of each other as well as in combination. However, the maximum benefit of the instant invention is obtained by combining the two embodiments as shown in the drawings.

In the drawings is shown a lure 10 whose body consists of a hollow, truncated, cone-shaped tube 12 which is bevelled at its anterior end 14 and posterior end 16. The tube 12 further includes a bottom 18 which is slightly flattened.

The lure 10 may be formed from aluminum, steel, sheet metal or any other suitable lightweight metal, or from plastic, wood, fiberglass or any material of suitable combination thereof. The lure 10 may be painted, be of metallic glister or remain in its natural state.

The anterior end 14 of the lure 10 further comprises a mouth 20 having a perforation 22 in its upper portion for attachment to a clasp 24 of a leader 26 (see FIG. 1). The mouth 20 also includes a bottom rim 28 which is turned down slightly to act as a scoop for sand. As seen in FIGS. 1 and 3, the lure 10 includes a multiplicity of apertures 30 at spaced locations along the tube 12, and particularly at the bottom and sides thereof. The size and shape of the apertures 30 are such that sand may be contained within the lure when the lure is in flight and the sand may be dispersed through said apertures when the lure strikes water. Preferably, the apertures 30 are approximately ⅛ to ¼ inch in diameter. A fine wire mesh 32 is removably affixed as a screen over the mouth 20 of the lure 10 for purposes to be discussed below. At the posterior end 16, which is substantially open, along the bottom 18, is incorporated a hook 34 with an accompanying appendage of feathers 36. However, bucktail, wool, plastic filaments or any other material suitable for attraction and disguise may be used as the appendage to the hook 34. Although the hook is preferably rigid (integral) with the lure 10, as shown, for reasons to be discussed below, it may be mobile. The hook 34 may be single, double or treble, and of any suitable size, shape and design. The hook is preferably fixed so that it may help orient the flat bottom of the lure on a shore.

The foregoing description substantially comprises one embodiment of the instant invention. A second embodiment of the instant invention consists of a lure having a substantially tubular body, but wherein the posterior portion weighs more than the anterior portion. Such a weight distribution is illustrated in FIG. 4, wherein a weighted plug 36 is lodged in the posterior portion of the lure by insertion through the anterior portion, thereby increasing the overall weight of the lure and the weight of the posterior portion with respect to the anterior portion so that the posterior portion is heavier than the anterior portion, thereby increasing the maximum possible casting distance, for reasons to be discussed below. It should be noted that any means of providing a lure with a posterior portion heavier than the anterior portion is within the scope of the second embodiment. The posterior portion can be made heavier by merely thickening the metal used therein.

In casting, the inventive lure is projected posterior end first, with the anterior end following. When the posterior portion is heavier than the anterior portion, no change in orientation takes place during the entire flight of the lure, in contradistinction to the performance of lures lacking the heavier posterior portion. Observation of most conventional lures during flight, after release, reveals that they describe an arc with the tip of the fishing rod which initially propels the lure tail-first in a straight light tangent to the arc. The conventional lure than turns 180° so that the anterior and posterior ends reverse positions, or the lure is observed to the broadside to the line of flight, to broach or flirt, thus increasing wind resistance, and causing loss of velocity and distance. In such a case, a mobile, trailing hook can foul the line by entanglement, either during flight, on striking the water surface or on retrieval. The inventive lure with the heavier posterior portion avoids the problems associated with a change of orientation of the lure during flight, and thereby increases casting distance. The integral hook is preferred to the mobile hook since an integral hook will not swivel in flight or on retrieval and consequently it will not engage the leader.

The first embodiment, characterized by the apertures 30, is capable of having its weight increased to thereby increase casting distance. The hollow lure may be retrieved so that it rests momentarily with its mouth across the line of retreating water when on a sandy shore. Wet sand will be deposited in the hollow lure, increasing its weight by one-half to one ounce, depending on the size of the lure and the amount of sand deposited. The hook is so fixed to the posterior lure portion that it helps orient the flat lure bottom on the shore, thereby facilitating deposition of sand into the lure mouth. This is particularly so when a treble hook is used, since two of the hookd act as vanes on the sand. The fine wire mesh is provided to cover the mouth of the lure to prevent impaction of pebbles larger than the opening in the posterior portion of the lure. The wire mesh can be removed from the lure mouth when the insertable plugs are to be used to increase the weight.

When the lure containing sand strikes the water at the end of the cast, the sand is immediately washed out, returning the lure to its original weight. The open posterior portion and apertures in the lure allow quick ejection of the sand and provide jet action as the lure is retrieved, thereby simulating the turbulence of a swimming baitfish.

Of course, if one is not fishing along a sandy shore, a portable supply of sand may be used to provide increased weight to the lure.

In actual trials on a windless day over a measured course on a sandy beach, an inventive lure having a posterior portion heavier than the anterior portion, and a hook integral with the lure was cast an average of 14 percent greater distance than a conventional lure of the same weight with a loosely-hanging, flailing hook.

Various modifications and changes are contemplated and may obviously be resorted to, without departing from the spirit or scope of the invention as hereinafter defined by the appended claims.

What is claimed is:

1. A fishing lure comprising a substantially cone-shaped tube, said tube being of larger diameter at its anterior portion and having a multiplicity of apertures in at least the sides and bottom thereof, said apertures having a size and shape such that sand may be retained within the tube when the lure is cast through the air and said sand may be dispersed from the tube when said lure strikes water.

2. The lure of claim 1, wherein the bottom of the tube is flattened.

3. The lure of claim 2, wherein the anterior portion of the tube is bevelled at an obtuse angle to the bottom of the tube.

4. The lure of claim 3, wherein said tube is formed from aluminum.

5. The lure of claim 3, wherein the anterior portion of said tube includes a mouth having a bottom rim which is turned down, whereby said may be scooped from a surface by the lure.

6. The lure of claim 5, additionally comprising a fine wire mesh screen removably affixed to the mouth of the lure, whereby impaction of pebbles larger than the opening in the posterior portion of the tube may be prevented.

7. The lure of claim 6, additionally comprising a hook rigidly affixed to the posterior portion of the tube.

8. The lure of claim 7, wherein the posterior portion weighs more than the anterior portion, whereby when the lure is cast through the air with the posterior portion leading, said posterior portion remains in the leading position for the duration of the flight through the air.

9. A fishing lure, comprising:
a substantially tubular body, having a multiplicity of apertures in the sides and bottom thereof, said apertures having a size and shape such that sand may be retained within the tubular body when the lure is cast through the air and said sand may be dispersed from the tubular body when said lure strikes water, said tubular body also having a posterior portion and an anterior portion, wherein the posterior portion weighs more than the anterior portion, whereby when the lure is cast through the air with the posterior portion leading, said posterior portion remains in the leading position for the duration of the flight through the air;
means at the anterior portion for attaching the lure to a leader; and
means at the posterior portion for attaching the lure to a hook.

10. The lure of claim 9, additionally comprising a weighted plug inserted in the posterior portion of the tubular body.

11. The lure of claim 1, wherein each of the apertures is approximately ⅛ to ¼ inch in diameter.

* * * * *